Aug. 27, 1929.　　　J. D. WOOD　　　1,726,253
ELECTRICAL DISTRIBUTION SYSTEM
Filed June 23, 1925
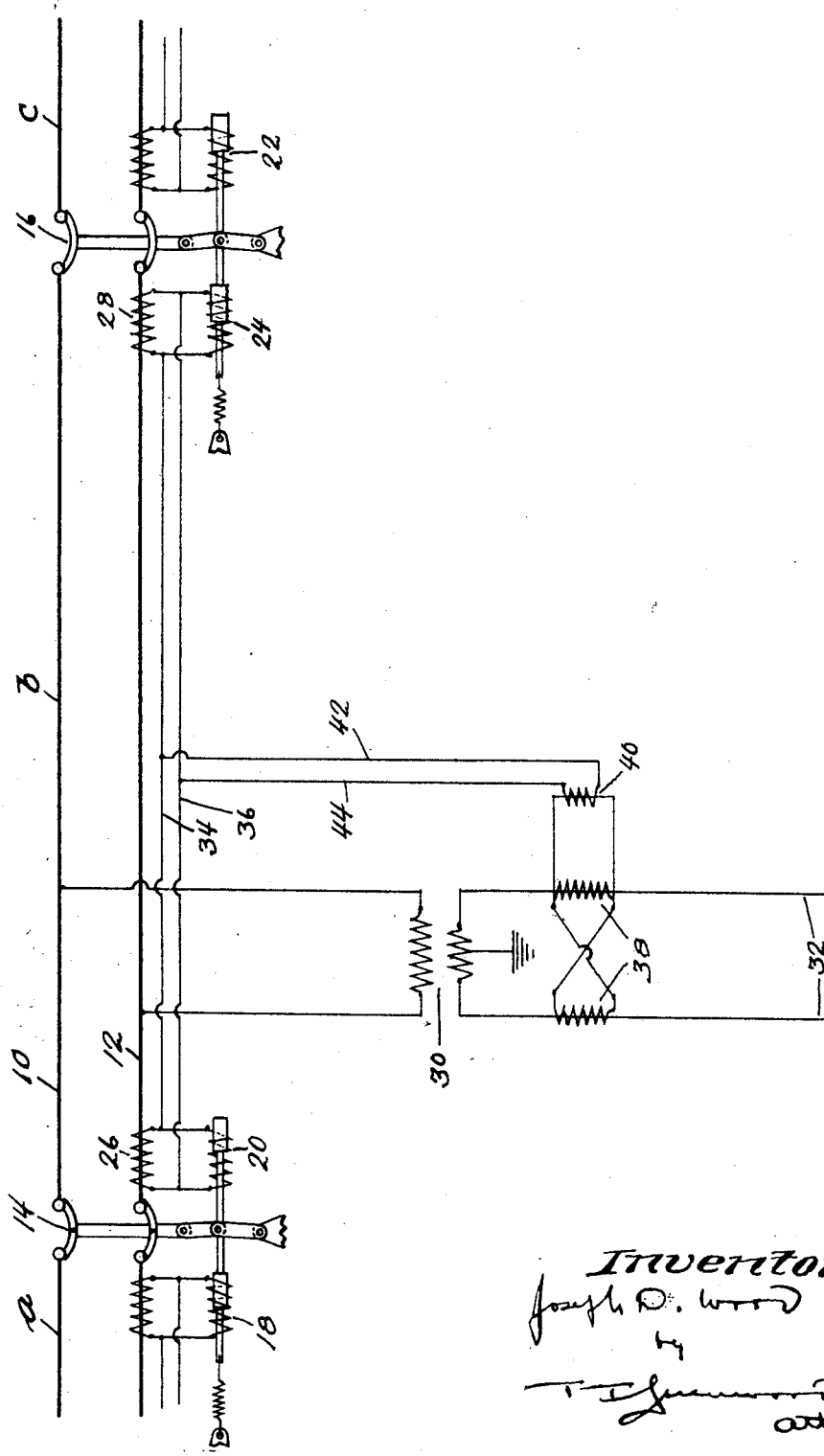
Inventor,
Joseph D. Wood
by
atty Patented Aug. 27, 1929.

1,726,253

UNITED STATES PATENT OFFICE.

JOSEPH D. WOOD, OF WOLLASTON, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

ELECTRICAL DISTRIBUTION SYSTEM.

Application filed June 23, 1925. Serial No. 39,102.

This invention relates to electric distribution systems, and has particular reference to methods for protecting sectionalized, feeder, or ring, systems against abnormal current conditions therein.

A feeder, and especially a ring feeder, may be arranged in a plurality of sections, and conjoining sections may be inter-connected through circuit breakers which are adapted to be opened upon overload, whereby to cut out the overload section from the system. Power is adapted to be taken from the sections, usually through step-down transformers which feed into out-going lines.

Each sectionalizing switch or circuit breaker is usually provided with independent trip coils, or equivalent switch-opening devices, which are separately actuated by overload conditions in the two sections associated with the circuit breaker, so that the circuit breaker will open in response to overload in either section, through the action of its appropriate trip coil.

The various trip coils are energized by current transformers, the primary windings of which are in the sections and the secondary windings of which are connected to actuate the trip coils. Each sectionalizing circuit breaker is provided with at least two current transformers, one of which is in the section on one side, and the other in the section on the other side, of the circuit-breaker and both are connected to actuate their respective trip coils.

The current transformers of a section are interconnected in series through a control or pilot circuit, in such a manner that, under normal current conditions, one short circuits the other and there is not sufficient potential effectively to energize the trip coils, which trip coils are connected in parallel with the current transformers. When, however, a fault develops in the section, or in a branch thereof, which develops an abnormal current flow, the flow of current in at least one of the transformers becomes relatively reversed, whereby to actuate the trip coils to effect the opening of the circuit breaker at both ends of the section.

A current transformer is associated with a branch line of the section and is connected with the pilot wires and section current transformers in such a manner that the sectionalizing breakers will open in response to faults in the section, or in the branch between the section and the branch current transformer therein.

For reliable and accurate operation of the sectionalizing breakers it is highly desirable that the current transformers have identical operating characteristics; that is, that in all transformers the secondary windings of which are tied together, equal current variations in the primary windings should result in proportionately equal current variations in the secondary windings. To obtain such equal current variations; it is desirable to have the transformers practically identical physically, as a change in dimensions usually changes the saturation point of the iron core and, especially, changes the leakage path between the primary and secondary windings, both of which combine to alter in a material manner the transformation curve, or the ratio of primary and secondary currents in the transformer.

While it is a relatively simple matter to provide practically identical current transformers for the ends of the section, it has been, heretofore, a highly difficult matter to provide a current transformer for the low tension side of the power transformer in a section-branch which will match the section current transformers, in characteristics. The branch current transformer must have a high transformation ratio. For instance, if the section current transformers have a ratio of, say, 100 to 1, and the branch power transformer has a ratio of 100 to 1, then the branch current transformer, which is in the low tension side of the power transformer, must have the very high transformation of 10,000 to 1. This ratio usually demands a transformer having very large physical dimensions as compared with the section current transformers, and is exceedingly difficult to design to match the section transformers.

It is an object of this invention to provide a system as above set forth which is so arranged and incorporates such apparatus that the current transformer energized from the section branch and tied in with the section current transformers has essentially the same operaing characteristics as, or is matched with, said section transformers. It is a further object of the invention to obviate the necessity for branch current transformers of high transformation ratio.

In the performance of the invention, the branch current transformer is made in two sections, or comprises two current transformers the secondary of the first of which energizes the primary of the second; and the secondary of the second is tied in with the section transformers. The overall transformation ratio of the two transformers is adapted to be that desired but the particular ratio of each transformer is not of vital importance. Since each transformer, by itself, may have a relatively low transformation ratio, its physical dimensions may be small and its operating characteristics may readily be predetermined. The second current transformer will be matched with the section transformers; the characteristic of the first current transformer is not important except that its magnetic circuit must not become saturated before that of the second transformer, and the transformation ratios of both, before saturation, should be approximately constant, which is easily accomplished.

A further object is generally to improve the performance of protective systems and apparatus associated therewith.

The figure is a diagrammatic illustration of a section of a single phase electrical distribution system having a protective system associated therewith which embodies the invention.

This invention is herein applied to a single phase ring-feeder system of distribution wherein the conductors 10 and 12 are separated into a plurality of sections $a$, $b$, $c$ which are normally interconnected through sectionalizing switches or circuit breakers 14 and 16. The circuit breaker 14 is provided with two independent trip coils 18 and 20, or equivalent devices, which are separately energized by the sections $a$ and $b$, whereby to provide for the opening of the circuit breaker upon the occurrence of an overload in either section. The circuit breaker 16 is similarly provided with trip coils 22 and 24 which are associated with the sections $c$ and $b$ respectively. Each trip coil is provided with a current transformer which is energized from its respective section; and trip coils 20 and 24 are energized from current transformers 26 and 28 respectively.

Power is taken from the high-tension section leads 10 and 12 through a branch line which includes a step-down power transformer 30, from which the low tension, high current, leads 32 extend.

The current transformers 26 and 28 are connected with each other through pilot wires 34 and 36. Current transformers are associated with the low tension transformer leads 32 and all transformers are so connected together that, under normal current flow, there is not sufficient potential on the pilot wires 34 and 36 to operate the trip coils. Upon the occurrence of a fault in the section, or in the branch including that portion of the low tension leads 32 between the current transformers therein and the section, sufficient potential is adapted to be set up to operate both trip coils 20 and 24 and open both circuit breakers 14 and 16.

The current transformers 26 and 28 may have a relatively high transformation ratio, as 100 to 1. The step-down power transformer 30 may feed, say, a house-lighting circuit and so may have a transformation ratio of, say, 100 to 1. The current transformers associated with the low-tension leads 32 of the power transformer must have, therefore, a transformation ratio of 10,000 to 1. As above set forth, a current transformer of such high ratio usually is relatively large, physically, and consequently expensive, and cannot readily be constructed to have the same operating characteristics as the section current transformers 26 and 28, with which it must be associated.

In accordance with this invention the current transformers in the low tension leads 32 comprise, essentially, two transformers 38 and 40 which are connected in series. Two similar transformers 38 may be employed in the low tension leads 32 and may be cross-connected, as shown, but function as a single transformer. The secondary windings of said transformers 38 feed into the primary winding of the transformer 40, the secondary winding of which is connected, through conductors 42 and 44, with the pilot wires 34 and 36. The transformation ratio of the separate transformers 38 and 40 may be any suitable values provided the combined ratio equals that desired. Preferably, however, the transformer 40 has a transformation ratio equal to that, and operating characteristics similar to those, of the section transformers 26 and 28 and, preferably, the transformer 40 is identical with transformers 26 and 28, or has a transformation ratio of 100 to 1. The transformers 38 may have, therefore, a transformation ratio of 100 to 1. The operating characteristics of the transformers 38 may be materially different from those of transformers 40, or 26 and 28, the only requirement being that the magnetic circuits thereof should not become saturated before those of transformers 40, 26 or 28, and that the secondary current should be a straight line function of the primary current for at least as long as in the other current transformers. These requirements are easily fulfilled.

From the above, it is apparent that the system provides reliability and accuracy of operation, with easily designed and constructed current transformers of low ratio and similar operating characteristics and which have relatively small physical dimensions and are, therefore, of relatively inexpensive construction.

While the invention is here shown as applied to a single phase distribution system, for simplicity, the manner of its adaptation to multi-phase systems will be obvious to one skilled in the art.

I claim:

1. An electrical distribution system including a circuit-section having circuit breakers connecting it with the system, trip coils for the circuit breakers, interconnected current transformers in the section for actuating the trip coils to open the circuit breakers under predetermined conditions, a branch circuit connected with the section and having a step-down power transformer therein, a current transformer energized from the output side of the power transformer, and a second current transformer energized from the last-named current transformer, and connected with said section transformers.

2. An electrical distribution system including a step-down power transformer, a circuit breaker controlling the connection of the transformer with the system, a trip coil for opening the circuit breaker under predetermined current conditions, a current transformer in the system for energizing said trip coil, and a pair of serially-connected current transformers one energized from the output side of said power transformer and feeding the other transformer and said other transformer cooperating with said system current transformer for controlling said trip coil.

3. An electrical distribution system having a high tension lead, a low tension lead fed through a step-down power transformer from said high tension lead, protective apparatus for the system including a current transformer energized from said high tension lead, a second transformer having its secondary connected with that of said first current transformer, and a third transformer energized from said low-tension lead and energizing said second transformer, the transformation ratio of said third current transformer being approximately equal to the transformation ratio of said power transformer.

4. An electrical distribution system having a high tension lead, a low tension lead fed through a step-down transformer from said high tension lead, protective apparatus for the system including a current transformer energized from said high tension lead, a second transformer having its secondary connected with that of said first current transformer, and a third transformer energized from said low-tension lead and energizing said second transformer, the transformation ratio of said first and second transformers being approximately equal, and the transformation ratio of said third transformer being approximately equal to that of said power transformer.

5. Transforming apparatus having a relatively high overall transformation ratio, including two transformers each having a primary and a secondary winding, one of which transformers energizes the other and has at least as good an operating characteristic as the other, each transformer having a relatively moderate transformation ratio and the combined ratio of both transformers totaling that desired, the fact that the operating characteristic of the energizing transformer is at least as good as that of the energized transformer providing a current in the secondary winding of the energized transformer which is proportional to the current in the primary winding of the energizing transformer up to the limit of the operating characteristic of the energized transformer.

6. A current transforming apparatus having a relatively high overall transformation ratio and comprising two transformers, one of which is an energizing transformer and the other of which is an energized transformer receiving its energy from said energizing transformer, each section having a relatively moderate transformation ratio and the combined ratio of both transformers totaling that desired, the energizing transformer characterized by having its magnetic circuit saturated at least not before the magnetic circuit of the energized transformer becomes saturated.

7. An electrical distribution system having two sections at different potential, a protective system for the distribution system including interconnected current transformers having approximately identical transformation ratios and operating characteristics associated with said sections, and means to compensate in one transformer, for the difference in potential between the sections.

8. An electrical distribution system having two sections at different potential, a protective system for the distribution system including interconnected current transformers having approximately identical transformation ratios and operating characteristics associated with said sections, and means to compensate, in one transformer, for the difference in potential between the sections, said means including a transformer energized by one section and energizing the current transformer for that section and having a transformation ratio which is approximately equal to the ratio of potentials of the two sections.

9. An electrical distribution system having two sections at different potential, a protective system for the distribution system including interconnected current transformers having approximately identical transformation ratios and operating characteristics associated with said sections, and means to compensate, in one transformer, for the difference in potential between the sections, said means including a transformer energized by the low potential section and energizing the current transformer for that section and having a transformation ratio which is approximately equal to the ratio of potentials of the two sections.

10. An electrical distribution system having two sections at different potential, a protective system for the distribution system including interconnected current transformers associated with said sections, which current transformers have approximately identical operating characteristics but not necessarily identical transformation ratios, and a transformer energized by one section and energizing the current transformer for that section, said last transformer having a transformation ratio which approximately compensates for any difference in transformation ratios of said current transformers and also for the difference in potential of the sections.

11. An electrical distribution system including a circuit section having circuit breakers connecting it with the system, trip coils for the circuit breakers, interconnected current transformers in the section for actuating the trip coils to open the circuit brakers under predetermined conditions, a branch circuit connected with the section and having a step-down power transformer therein, a current transformer energized from the output side of the power transformer, and a second current transformer energized from the last-named current transformer, and connected with said section transformers, said second and said section transformers having approximately equal transformation ratios, and said first current transformer and said power transformer having approximately equal transformation ratios.

In testimony whereof, I have signed my name to this specification.

JOSEPH D. WOOD.